(12) United States Patent
Lee

(10) Patent No.: US 11,318,900 B2
(45) Date of Patent: May 3, 2022

(54) BUMPER BEAM OF VEHICLE

(71) Applicant: LOTTE CHEMICAL CORPORATION, Seoul (KR)

(72) Inventor: Myung Ho Lee, Daejeon (KR)

(73) Assignee: Lotte Chemical Corporation, Seoul (KR)

( * ) Notice: Subject to any disclaimer, the term of this patent is extended or adjusted under 35 U.S.C. 154(b) by 46 days.

(21) Appl. No.: 16/765,240

(22) PCT Filed: Nov. 29, 2018

(86) PCT No.: PCT/KR2018/014971
§ 371 (c)(1),
(2) Date: May 19, 2020

(87) PCT Pub. No.: WO2019/107974
PCT Pub. Date: Jun. 6, 2019

(65) Prior Publication Data
US 2020/0346600 A1 Nov. 5, 2020

(30) Foreign Application Priority Data

Nov. 29, 2017 (KR) ........................ 10-2017-0161942

(51) Int. Cl.
*B60R 19/18* (2006.01)
*B60R 19/24* (2006.01)

(52) U.S. Cl.
CPC .............. *B60R 19/18* (2013.01); *B60R 19/24* (2013.01)

(58) Field of Classification Search
CPC ................................ B60R 19/18; B60R 19/24
See application file for complete search history.

(56) References Cited

U.S. PATENT DOCUMENTS

| 7,537,252 B2 | 5/2009 | Nagai et al. |
| 7,896,408 B2 | 3/2011 | Hashimoto et al. |
| 2006/0181089 A1 | 8/2006 | Andre et al. |
| 2008/0012364 A1 | 1/2008 | Boggess |

(Continued)

FOREIGN PATENT DOCUMENTS

| JP | 2003-220909 A | 8/2003 |
| JP | 2005-520735 A | 7/2005 |
| JP | 2007-533545 A | 11/2007 |

(Continued)

OTHER PUBLICATIONS

International Search Report in counterpart International Application No. PCT/KR2018/014971 dated Mar. 8, 2019, pp. 1-4.

*Primary Examiner* — D Glenn Dayoan
*Assistant Examiner* — Melissa Ann Bonifazi
(74) *Attorney, Agent, or Firm* — Additon, Pendleton & Witherspoon, P.A.

(57) ABSTRACT

A bumper beam of a vehicle according to the present invention includes a pair of mounting portions for being fixed to a vehicle member, a supporting portion having a cross-section in which a front surface is closed and a rear surface opens and having both ends supporting the pair of mounting portions, a web disposed in front of the supporting portion, an energy absorbing portion supporting a rear surface of the web and supported by the front surface of the supporting portion to absorb energy generated when a colliding object collides to with the web, and an energy transmitting portion connecting the energy absorbing portion and the pair of mounting portions.

11 Claims, 9 Drawing Sheets

(56) References Cited

U.S. PATENT DOCUMENTS

2018/0141512 A1     5/2018   Munjurulimana
2018/0186984 A1     7/2018   Kim et al.

FOREIGN PATENT DOCUMENTS

| | | |
|---|---|---|
| JP | 4203079 B2 | 10/2008 |
| JP | 2009-241869 A | 10/2009 |
| KR | 10-1997-0039258 A | 7/1997 |
| KR | 10-2009-0029912 A | 3/2009 |
| KR | 10-2013-0065136 A | 6/2013 |
| KR | 10-2014-0120178 A | 10/2014 |
| KR | 10-1456465 B1 | 10/2014 |
| KR | 10-1513550 B1 | 4/2015 |
| KR | 10-1688320 B1 | 1/2017 |
| WO | 2016/193935 A1 | 12/2016 |
| WO | 2019/107974 A1 | 6/2019 |

BUMPER BEAM OF VEHICLE

CROSS-REFERENCE TO RELATED APPLICATION

This application claims priority to and the benefit of Korean Patent Application No. 10-2017-0161942 filed in the Korean Intellectual Property Office on Nov. 29, 2017, the entire contents of which are incorporated herein by reference.

This application also claims priority to and the benefit of International Application No. PCT/KR2018/014971, filed Nov. 29, 2018, which published as WO 2019/107974 on Jun. 6, 2019, the entire disclosure of which is also incorporated herein by reference.

TECHNICAL FIELD

The present invention relates to a bumper beam of a vehicle. More particularly, the present invention relates to a bumper beam of a vehicle that is mounted on a front and a rear of a vehicle body to protect the vehicle body and occupants, as well as to protect an engine and various devices mounted in a hood and an engine compartment.

BACKGROUND OF THE INVENTION

The bumper beam is required to meet laws and regulations for low-speed collision and tests of property insurance companies (RCAR, IIHS) that are compliance items. In addition, laws and regulations for low-speed collision are classified into North America (Canada), North America (USA), domestic demand, China, and general regions depending on vehicle sales areas, and required performance of the laws and the regulations in North America (Canada) is higher than other laws and regulations.

16-inch and 20-inch pendulum tests consisting of a central region hitting, a hitting at a 300 mm shift position from the center, and a corner region hitting, and a collision test with a vertically installed flat fixed wall are conducted, and these tests are continuously conducted on one bumper beam.

Due to these requirements, most bumper beams satisfying the performance required by the laws and the regulations for low-speed collision in North America (Canada) are made of steels, aluminums, and press-molded composite materials.

On the other hand, bumper beams made by injection molding are generally sold in regions with weak regulatory regulations such as China, India, and Brazil, but have limitations that it is difficult to satisfy continuous performance tests required by laws and regulations in North America.

CONTENTS OF THE INVENTION

Object to be Achieved

The present invention has been made in an effort to provide a bumper beam of a vehicle having advantages of being capable of meeting performance conditions required by countries with relatively strong regulations among bumper beam systems of laws and regulations for low-speed collision while being produced by injection molding.

Means for Achieving the Object

A bumper beam of a vehicle according to the present invention may include a pair of mounting portions for being fixed to a vehicle member, a supporting portion having a cross-section in which a front surface is closed and a rear surface opens and having both ends supporting the pair of mounting portions, a web disposed in front of the supporting portion, an energy absorbing portion supporting a rear surface of the web and supported by the front surface of the supporting portion to absorb energy generated when a colliding object collides with the web, and an energy transmitting portion connecting the energy absorbing portion and the pair of mounting portions.

The pair of mounting portions, the supporting portion, the web, the energy absorbing portion, and the energy transmitting portion may be integrally formed by injection molding.

The supporting portion may include a supporting plate disposed in a vertical direction, an upper flange extending rearward from a top of the supporting plate, a lower flange extending rearward from a bottom of the supporting plate, and a pair of side walls, each being connected to each of the pair of mounting portions, wherein the web has a plate shape and is disposed in front of the supporting plate in the vertical direction, and the energy absorbing portion has a plate shape, is disposed in a horizontal direction, and connects the supporting plate and the web.

The bumper beam of the vehicle may further include a first rib connecting the web, the energy absorbing portion, and the supporting plate.

The bumper beam of the vehicle may further include a second rib connecting the upper flange, the supporting plate, and the lower flange.

The bumper beam of the vehicle may further include a third rib disposed between the upper flange and the lower flange and connecting the supporting plate and the pair of side walls in the horizontal direction.

The bumper beam of the vehicle may further include a fourth rib connecting the upper flange, the supporting plate, and the third rib, and a fifth rib connecting the lower flange, the supporting plate, and the third rib.

A plurality of third ribs may be provided.

The bumper beam of the vehicle may further include a sixth rib connecting the supporting plate and the plurality of third ribs.

The web may include an upper web extending upwardly from the energy absorbing portion.

The web may include a lower web extending downwardly from the energy absorbing portion.

Effect of the Invention

The bumper beam of the vehicle according to the present invention can induce collision energy absorption of the bumper beam through an efficient structure, can be effective in suppressing damage of the bumper beam by preventing damage of the mounting portion, and can satisfy conditions of continuous collision tests.

In addition, since the bumper beam of the vehicle according to the present invention can be made by an injection molding method, there are effects of reducing a weight of the bumper beam and a production cost.

DETAILS FOR EXECUTING THE INVENTION

Figure 1:
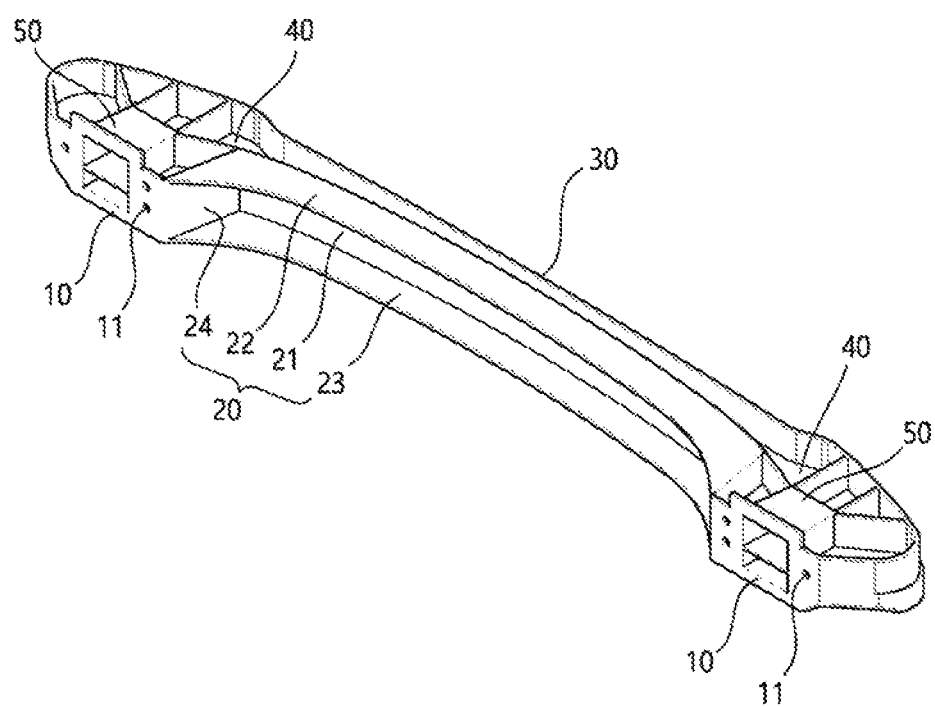
FIG. 1 is a perspective view of a bumper beam of a vehicle according to the first exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

First Exemplary Embodiment

Figure 2:
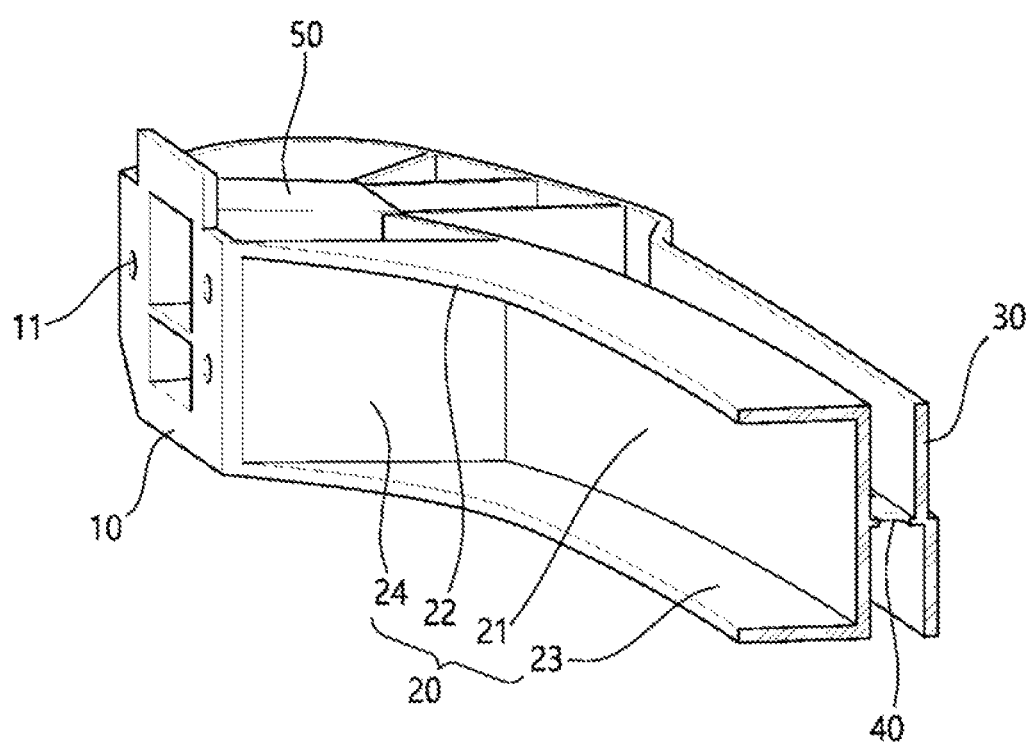
FIG. 2 is a cross-sectional perspective view of a bumper beam of a vehicle according to the first exemplary embodiment of the present invention.

FIG. 1 is a perspective view of a bumper beam of a vehicle according to the first exemplary embodiment of the present invention, and FIG. 2 is a cross-sectional perspective view of a bumper beam of a vehicle according to the first exemplary embodiment of the present invention.

Referring to FIG. 1 and FIG. 2, a bumper beam of a vehicle according to the first exemplary embodiment of the present invention may include a mounting portion 10, a supporting portion 20, a web 30, an energy absorbing portion 40, and an energy transmitting portion 50.

The mounting portion 10 is provided for being fixed with a vehicle member such as a front side frame of the vehicle. The mounting portion 10 has a plate shape and can be disposed in a vertical direction. Engaging holes 11 for being engaged with the vehicle member may be formed in the mounting portion 10. Since a pair of members such as the left and right vehicle front side frames are provided, a pair of mounting portions 10 such as left and right mounting portions may be provided to correspond to the vehicle members.

Both ends of the supporting portion 20 support the pair of mounting portions 10. The supporting portion 20 may include a supporting plate 21, an upper flange 22, a lower flange 23, and a pair of side walls 24. The supporting plate 21 may have a plate shape in which a central portion is protruded forward and both ends are curved rearward from the central portion. The supporting plate 21 can be disposed in the vertical direction. The upper flange 22 can extend rearward from a top of the supporting plate 21. The lower flange 23 can extend rearward from a bottom of the supporting plate 21. The pair of side walls 24 is disposed at both ends of the supporting plate 21 and each of which is connected to the mounting portion 10. Therefore, the supporting portion 20 may have a cross-section in which a front surface of the supporting portion 20 is closed and a rear surface of the supporting portion 20 opens.

The web 30 is a portion that firstly contacts with a colliding object, and may have a shape corresponding to the supporting plate 21. The web 30 may be disposed in front of the supporting portion 20 to prevent collision energy due to initial contact with the colliding object from being directly transferred to the supporting plate 21.

The energy absorbing portion 40 may have a plate shape and dispose in a horizontal direction. The energy absorbing portion 40 can connect a rear surface of the web 30 and the front surface of the supporting portion 20. The energy absorbing portion 40 absorbs energy which is generated when the colliding object collides with the web 30 and is transferred to the web 30.

A pair of energy transmitting portions 50 is provided, and each of the pair of energy transmitting portions 50 is disposed between the energy absorbing portion 40 and each of the pair of mounting portions 10. The energy transmitting portion 50 prevents the energy transferred to the energy absorbing portion 40 from being transmitted to the mounting portion 10.

The pair of mounting portions 10, the supporting portion 20, the web 30, the energy absorbing portion 40, and the energy transmitting portion 50 may be made by injection molding. Accordingly, the bumper beam of the vehicle according to the first exemplary embodiment of the present invention can improve productivity, and it is possible to lighten the bumper beam.

As described above, in the bumper beam of the vehicle according to the first exemplary embodiment of the present invention, the energy absorbing portion 40 absorbs the energy applied to the web 30 during the initial collision with the collider, and collision energy absorption of the bumper beam due to elastic or plastic deformation of the upper flange 22 and lower flange 23 may be induced.

In addition, the bumper beam of the vehicle according to the first exemplary embodiment of the present invention can prevent damage of the mounting portions 10 by preventing the collision energy absorbed by the energy absorbing portion 40 from being excessively transmitted to the mounting portion 10 by the energy transmitting portion 50.

In addition, the bumper beam of the vehicle according to the first exemplary embodiment of the present invention can effectively suppress the breakage of the bumper beam due to its low rigidity, and can satisfy conditions of continuous collision tests.

Hereinafter, the bumper beams of the vehicle according to other exemplary embodiments of the present invention will be described. In the following description, the same reference numerals are assigned to the same of similar constituent elements of the bumper beam of the vehicle according to the first exemplary embodiment of the present invention described above, and detailed description thereof will be omitted. Therefore, constituent elements in which detailed description is omitted in the following description should be understood with reference to the above-described description.

Second Exemplary Embodiment

Figure 3:
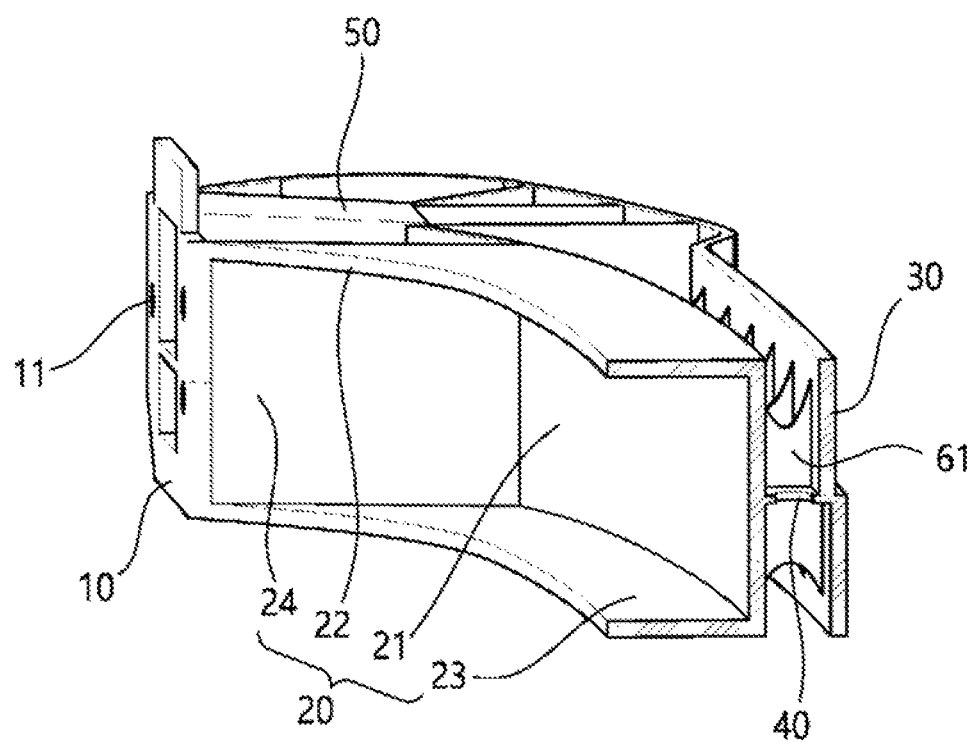
FIG. 3 is a cross-sectional perspective view of a bumper beam of a vehicle according to the second exemplary embodiment of the present invention.

FIG. 3 is a cross-sectional perspective view of a bumper beam of a vehicle according to the second exemplary embodiment of the present invention.

Referring to FIG. 3, the bumper beam of the vehicle according to the second exemplary embodiment of the present invention may include the mounting portion 10, the supporting portion 20, the web 30, the energy absorbing portion 40, and the energy transmitting portion 50. In particular, the bumper beam of the vehicle according to the second exemplary embodiment of the present invention may further include a first rib 61.

The first rib 61 connects the web 30, the energy absorbing portion 40, and the supporting plate 21. The first rib 61 reinforces a space between the web 30 and the supporting plate 21, thereby effectively preventing the collision energy applied to the web 30 form being concentrated on the energy absorbing portion 40 and effectively canceling the collision energy.

Third Exemplary Embodiment

Figure 4:
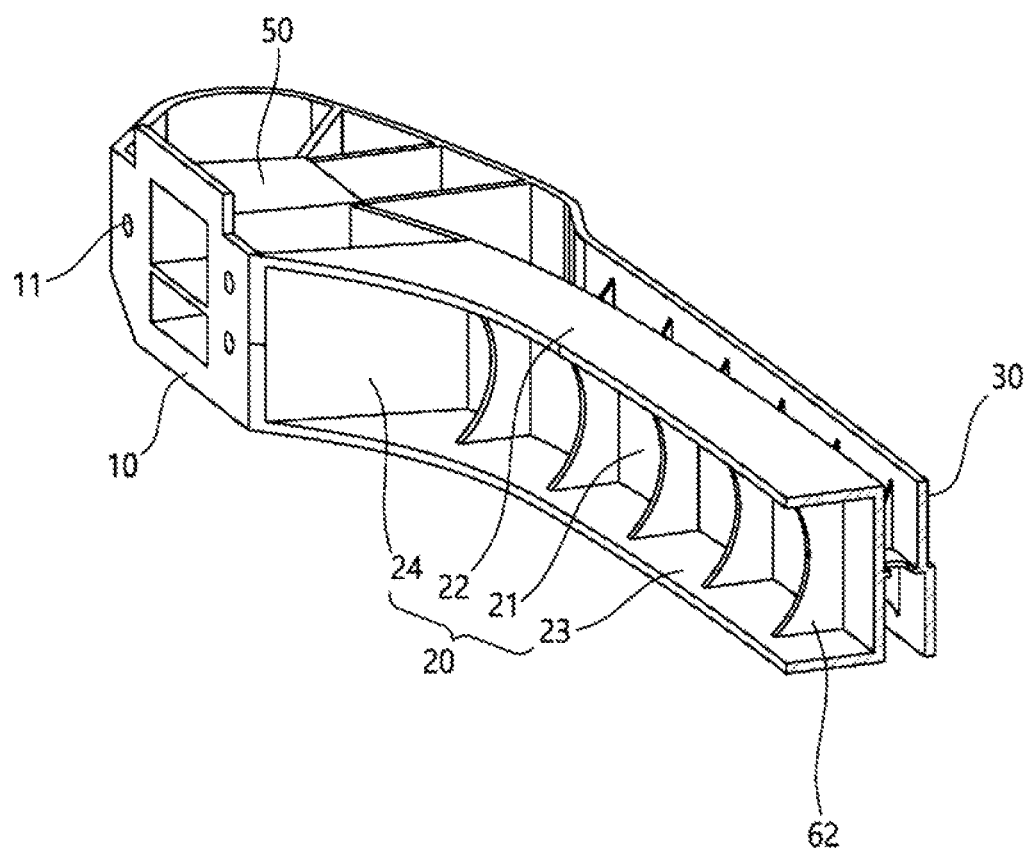
FIG. 4 is a cross-sectional perspective view of a bumper beam of a vehicle according to the third exemplary embodiment of the present invention.

FIG. 4 is a cross-sectional perspective view of a bumper beam of a vehicle according to the third exemplary embodiment of the present invention.

Referring to FIG. 4, the bumper beam of the vehicle according to the third exemplary embodiment of the present invention may include the mounting portion 10, the supporting portion 20, the web 30, the energy absorbing portion 40, and the energy transmitting portion 50. Particularly, the bumper beam of the vehicle according to the third exemplary embodiment of the present invention may further include a second rib 62.

The second rib 62 connects the upper flange 22, the supporting plate 21, and the lower flange 23. The second rib 62 reinforces an inner space of the supporting portion 20 that is open rearward, thereby effectively distributing the collision energy of the bumper beam due to elastic or plastic deformation of the upper flange 22 and the lower flange 23 and effectively canceling the collision energy.

A plurality of second ribs 62 is provided and is orthogonal to the upper flange 22 and the lower flange 23. The plurality of second ribs 62 may be dispose apart from each other.

Fourth Exemplary Embodiment

Figure 5:
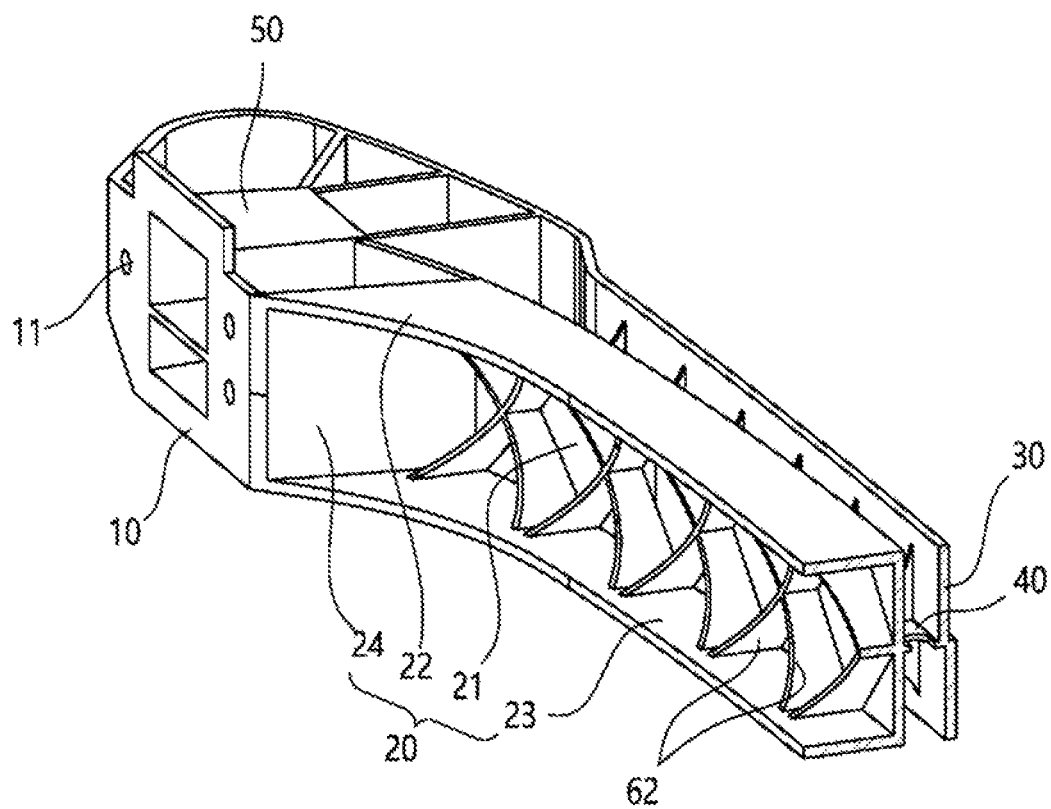
FIG. 5 is a cross-sectional perspective view of a bumper beam of a vehicle according to the fourth exemplary embodiment of the present invention.

FIG. 5 is a cross-sectional perspective view of a bumper beam of a vehicle according to the fourth exemplary embodiment of the present invention.

Referring to FIG. 5, the bumper beam of the vehicle according to the fourth exemplary embodiment of the present invention may include the mounting portion 10, the supporting portion 20, the web 30, the energy absorbing portion 40, and the energy transmitting portion 50. In particular, the bumper beam of the vehicle according to the fourth exemplary embodiment of the present invention includes the plurality of second ribs 62, and the plurality of second ribs 62 may be arranged in a pattern in which a pair of second ribs 62 crosses each other.

Likewise, the second rib 62 reinforces the inner space of the supporting portion 20 that is open rearward, thereby effectively distributing the collision energy of the bumper beam due to elastic or plastic deformation of the upper flange 22 and the lower flange 23 and effectively canceling the collision energy.

Fifth Exemplary Embodiment

Figure 6:
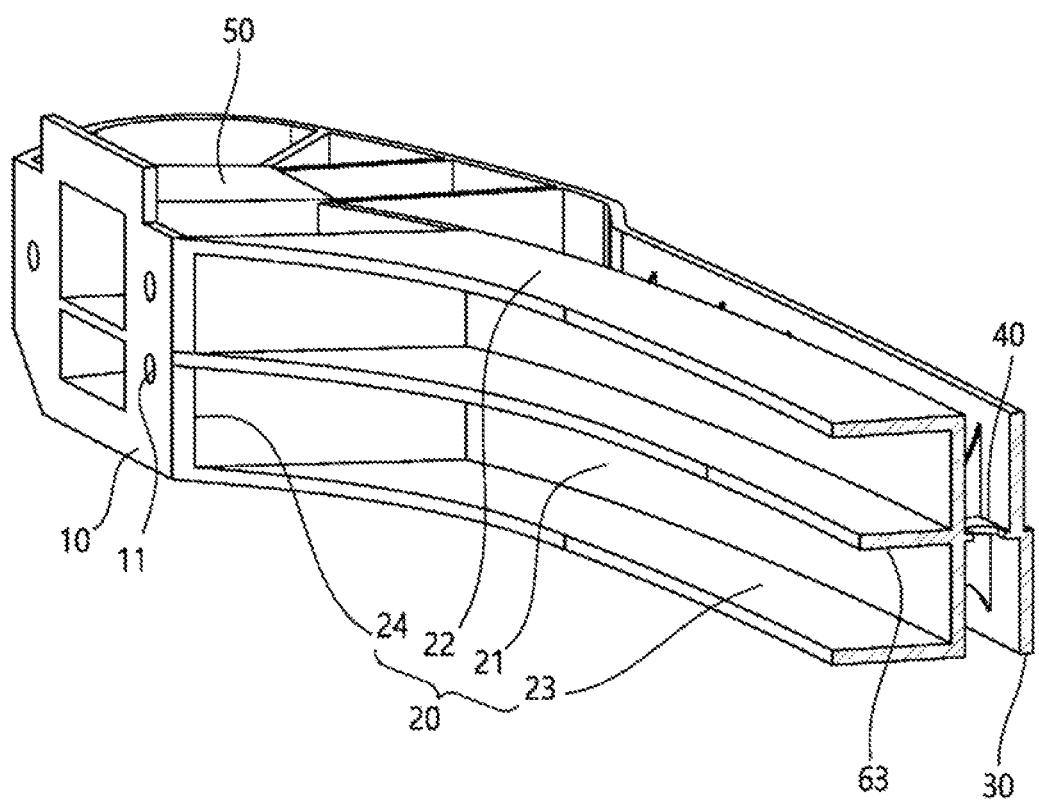
FIG. 6 is a cross-sectional perspective view of a bumper beam of a vehicle according to the fifth exemplary embodiment of the present invention.

FIG. 6 is a cross-sectional perspective view of a bumper beam of a vehicle according to the fifth exemplary embodiment of the present invention.

Referring to FIG. 6, the bumper beam of the vehicle according to the fifth exemplary embodiment of the present invention may include the mounting portion 10, the supporting portion 20, the web 30, the energy absorbing portion 40, and the energy transmitting portion 50. In particular, the bumper beam of the vehicle according to the fifth exemplary embodiment of the present invention may include a third rib 63.

The third rib 63 connects the supporting plate 21 and the pair of side walls 24 in the horizontal direction. The third rib 63 reinforces a space between the pair of side walls 24, thereby effectively distributing the collision energy of the bumper beam generated at sides of the vehicle body and effectively canceling the collision energy.

Sixth Exemplary Embodiment

Figure 7:
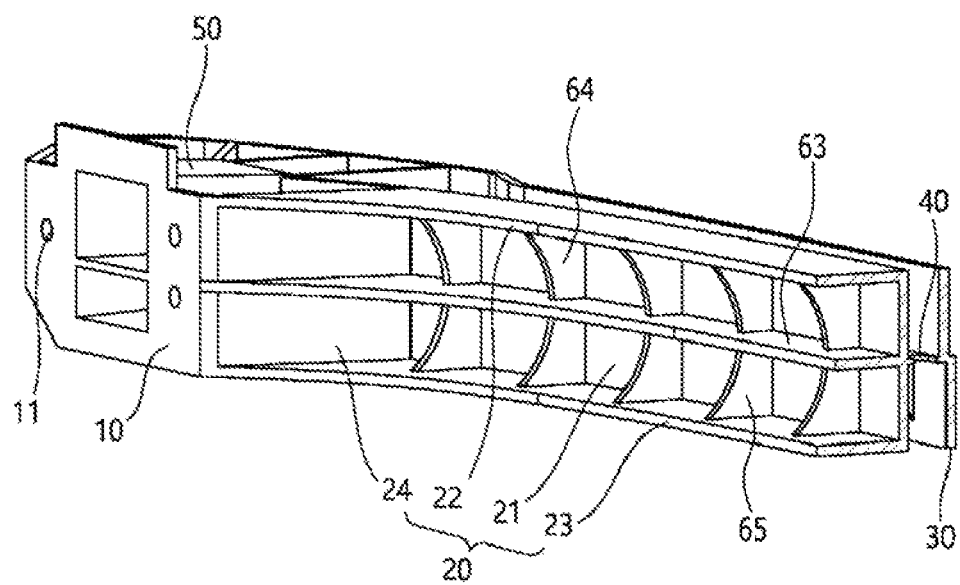
FIG. 7 is a cross-sectional perspective view of a bumper beam of a vehicle according to the sixth exemplary embodiment of the present invention.

FIG. 7 is a cross-sectional perspective view of a bumper beam of a vehicle according to the sixth exemplary embodiment of the present invention.

Referring to FIG. 7, the bumper beam of the vehicle according to the sixth exemplary embodiment of the present invention may include the mounting portion 10, the supporting portion 20, the web 30, the energy absorbing portion 40, and the energy transmitting portion 50. In particular, the bumper beam of the vehicle according to the sixth exemplary embodiment of the present invention may further include a fourth rib 64 and a fifth rib 65. The fourth rib 64 connects the upper flange 22, the supporting plate 21, and the third rib 63. The fifth rib 65 connects the lower flange 23, the supporting plate 21, and the third rib 63.

The fourth rib 64 reinforces a space between the third rib 63 and the upper flange 22, and the fifth rib 65 reinforces a space between the third rib 63 and the lower flange 23, thereby effectively distributing the collision energy of the bumper beam due to elastic or plastic deformation of the upper flange 22 and the lower flange 23 and effectively canceling the collision energy.

Although it is described in the above description that the bumper beam of the vehicle according to the fifth exemplary embodiment of the present invention includes one third rib 63, and the bumper beam of the vehicle according to the sixth exemplary embodiment of the present invention further includes the fourth rib 64 and the fifth rib 65 corresponding to the one third rib 63, it should not be interpreted as limiting the scope of the present invention. The number of the third ribs 63 can be increased as much as possible, and the number of the fourth ribs 64 and the fifth ribs 65 can also be increased corresponding to the number of the third ribs 63.

Figure 8:
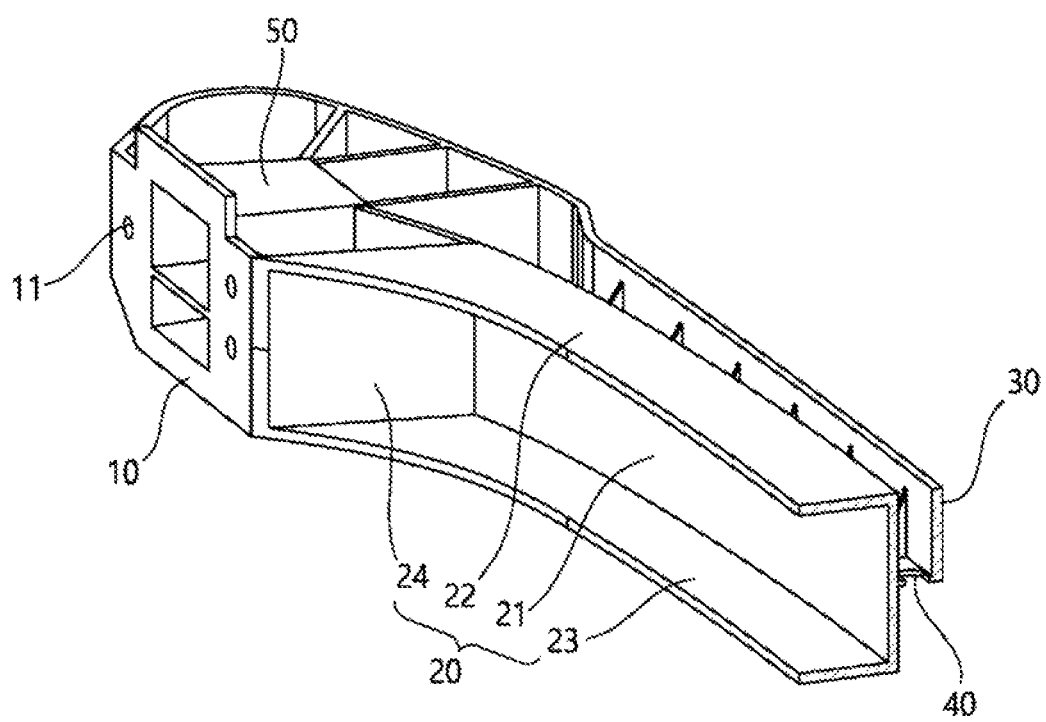
FIG. 8 is a cross-sectional perspective view of a bumper beam of a vehicle according to the seventh exemplary embodiment of the present invention.
Figure 9:
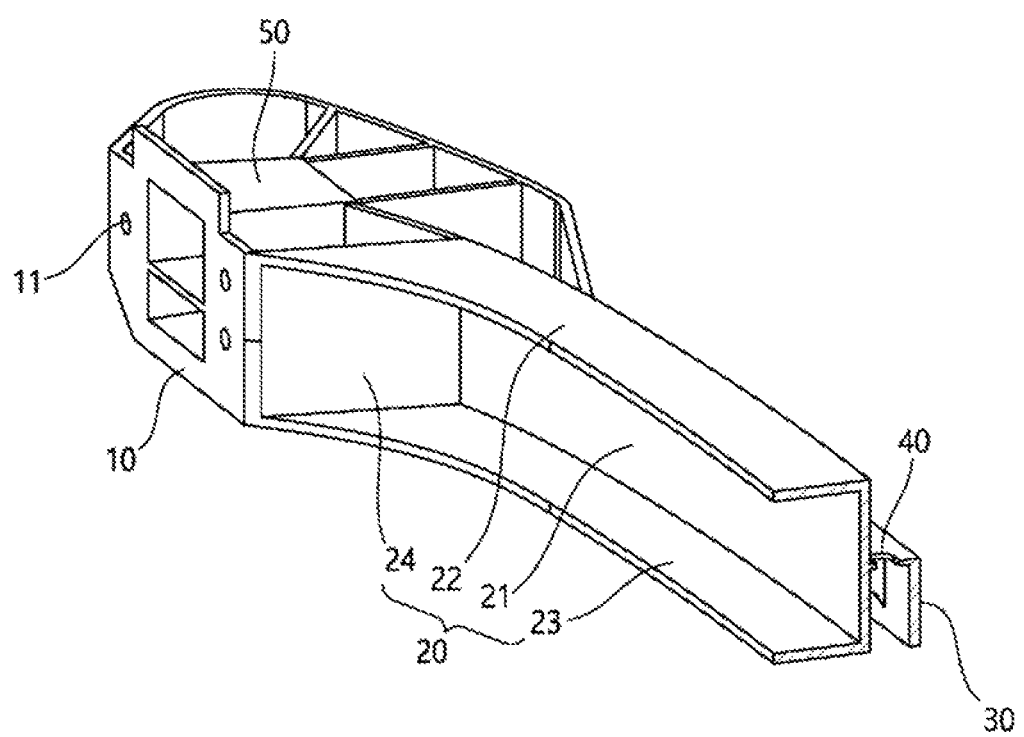
FIG. 9 is a cross-sectional perspective view of a bumper beam of a vehicle according to the eighth exemplary embodiment of the present invention.

On the other hand, in the exemplary embodiments of the present invention described above, the exemplary embodiments in which the web 30 extends on both of an upper side and a lower side of the energy absorbing portion 40 are described and illustrated in the attached drawings. However, as shown in FIG. 8, the web 30 can be extended only on the upper side of the energy absorbing portion 40 and, as shown in FIG. 9, the web 30 can be extended only on the lower side of the energy absorbing portion 40.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

[Description of symbols]

| | |
|---|---|
| 10: mounting portion | 11: engaging hole |
| 20: supporting portion | 21: supporting plate |
| 22: upper flange | 23: lower flange |
| 24: side wall | 30: web |
| 40: energy absorbing portion | 50: energy transmitting portion |
| 61: first rib | 62: second rib |
| 63: third rib | 64: fourth rib |
| 65: fifth rib | |

The invention claimed is:

1. A bumper beam of a vehicle comprising:
a pair of mounting portions for being fixed to a vehicle member;
a supporting portion having a cross-section in which a front surface is closed and a rear surface opens and having both ends supporting the pair of mounting portions;
a web disposed in front of the supporting portion;
an energy absorbing portion supporting a rear surface of the web and supported by the front surface of the supporting portion to absorb energy generated when a colliding object collides with the web; and
a pair of energy transmitting portions connecting the energy absorbing portion and the pair of mounting portions to prevent energy absorbed by the energy absorbing portion from being transmitted to the mounting portion,
wherein the pair of mounting portions, the supporting portion, the web, the energy absorbing portion, and the pair of energy transmitting portions are of the same material.

2. The bumper beam of claim 1, wherein the pair of mounting portions, the supporting portion, the web, the energy absorbing portion, and the energy transmitting portion are integrally formed by injection molding.

3. The bumper beam of claim 1, wherein the supporting portion comprises:
a supporting plate disposed in a vertical direction;
an upper flange extending rearward from a top of the supporting plate;
a lower flange extending rearward from a bottom of the supporting plate; and
a pair of side walls, each being connected to each of the pair of mounting portions,
wherein the web has a plate shape and is disposed in front of the supporting plate in the vertical direction, and
the energy absorbing portion has a plate shape, is disposed in a horizontal direction, and connects the supporting plate and the web.

4. The bumper beam of claim 3, further comprising a first rib connecting the web, the energy absorbing portion, and the supporting plate.

5. The bumper beam of claim 3, further comprising a second rib connecting the upper flange, the supporting plate, and the lower flange.

6. The bumper beam of claim 3, further comprising a third rib disposed between the upper flange and the lower flange and connecting the supporting plate and the pair of side walls in the horizontal direction.

7. The bumper beam of claim 6, further comprising:
a fourth rib connecting the upper flange, the supporting plate, and the third rib; and
a fifth rib connecting the lower flange, the supporting plate, and the third rib.

8. The bumper beam of claim 6, wherein a plurality of third ribs is provided.

9. The bumper beam of claim 8, further comprising a sixth rib connecting the supporting plate and the plurality of third ribs.

10. The bumper beam of claim 3, wherein the web includes an upper web extending upwardly from the energy absorbing portion.

11. The bumper beam of claim 3, wherein the web includes a lower web extending downwardly from the energy absorbing portion.

\* \* \* \* \*